Feb. 20, 1923.
F. KOVATCH.
SPRING SNARE.
FILED SEPT. 14, 1922.
1,445,892.
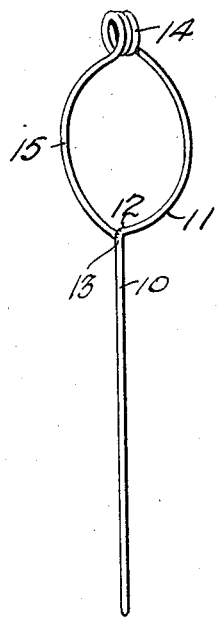
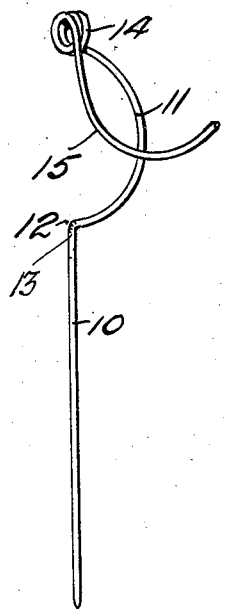
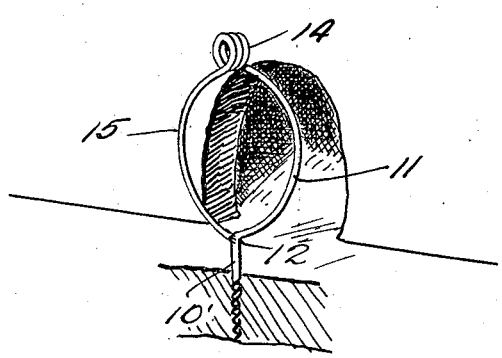
Inventor
Frank Kovatch
By Horace C. Sadler
Attorney Patented Feb. 20, 1923.

1,445,892

UNITED STATES PATENT OFFICE.

FRANK KOVATCH, OF OMAHA, NEBRASKA.

SPRING SNARE.

Application filed September 14, 1922. Serial No. 588,161.

*To all whom it may concern:*

Be it known that I, FRANK KOVATCH, a citizen of the United States, residing at Omaha, in the county of Douglas, State of Nebraska, have invented certain new and useful Improvements in Spring Snares; and I do hereby declare the following to be a full, clear, and exact description of the invention, such as will enable others skilled in the art to which it appertains to make and use the same.

This invention relates to new and useful improvements in traps and particularly to traps known as "snares".

One object of the invention is to provide a trap of this character which is simple in construction, strong, durable, and effective in its operation, and which can be manufactured at a low cost.

Another object is to provide a trap of this character which is adapted to be driven into the ground at the opening of the animal's lair, or in the floor of a room, at a rat opening, and which will be quickly and easily released when the animal thrusts its head through the ring, to tightly grip the animal around the neck, to strangle the animal.

Other objects and advantages will be apparent from the following description when taken in connection with the accompanying drawing.

In the drawing:

Figure 1 is a perspective view of the trap in set position, when used out doors.

Figure 2 is a perspective view of the trap of Figure 1, in sprung position.

Figure 3 is a perspective view of the trap when used in-doors.

Referring particularly to the accompanying drawing, the trap is formed from a single length of suitable stiff wire, and includes the stem or shank 10, which is adapted to be driven into the ground at the opening of the animal's lair. The upper end of the stem is bowed laterally, as shown at 11, resulting in the shoulder 12, in which are formed the transverse nicks or notches 13. The other end of the bowed portion 11, is formed into a series of spring coils 14, and from thence the end of the wire is bowed in a direction opposite to that of the portion 11, as shown at 15, with its terminal arranged to enter one or another of the nicks 13, to hold the bowed portion 15 in such relation to the bowed portion 11, that the two bowed portions form a complete ring, into which the animal thrusts its head. This ring portion, when the stem is driven into the ground, is disposed over and surrounds the opening of the animal's lair, so that when the animal pushes its head through the ring, the bowed portion 15 will be released from the nicks, and by means of the strong spring action of the coils will fly across toward the bowed portion 11, clamping the animal's neck, or body therebetween.

The fact that the stem is driven into the ground, serves as an anchor for the trap, and prevents the animal carrying the trap away.

In the form of the device shown in Figure 3, the stem 10' is considerably shorter than that of the other form, and this shank is externally threaded so that it may be screwed into the floor opposite a rat hole in the floor or wall, when the device is to be used in-doors. Otherwise the construction of this form is the same as the other form.

What is claimed is:

1. An animal trap comprising a stem having a jaw on one end, and a spring jaw carried on the first jaw and flexible toward and away from the first jaw and arranged to engage with one end of the stem when in set position.

2. An animal trap comprising a stem having a bowed jaw on one end, a spring bowed jaw carried by the outer end of the first jaw and flexible toward and away from the first jaw, and means on the stem adjacent the other end of the first jaw for engagement by the free end of the second jaw to hold the latter in set position.

3. An animal trap formed from a single length of spring material having a ground-penetrating stem, a bowed jaw formed on one end, the outer end of the jaw being formed with spring coils and extended to form a second bowed spring jaw, the portion of the device between the first jaw and stem being formed with notches for reception of the outer end of the second jaw to hold the latter in set position.

In testimony whereof, I affix my signature, in the presence of two witnesses.

FRANK KOVATCH.

Witnesses:
 GUY G. ELDRIDGE,
 HARRY A. PEARCE.